Feb. 25, 1958 R. J. HOYLE, JR 2,824,342
FABRICATED POLE
Filed June 16, 1953 2 Sheets-Sheet 1
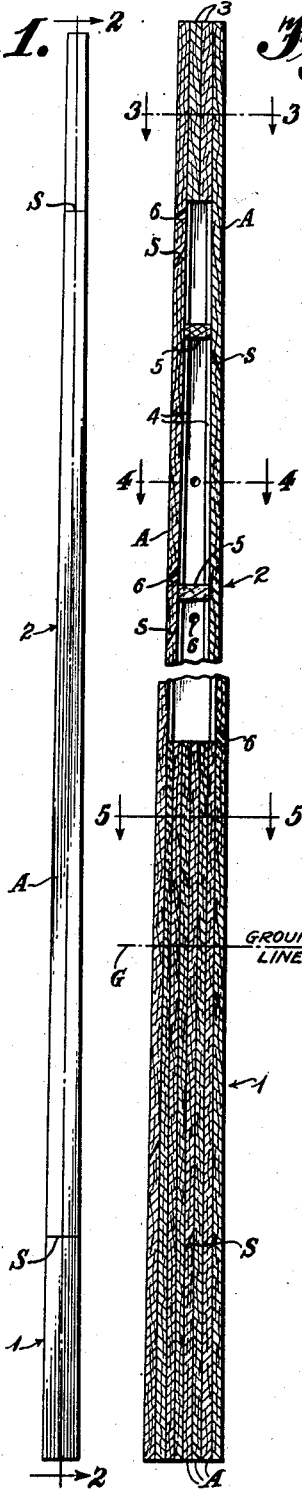
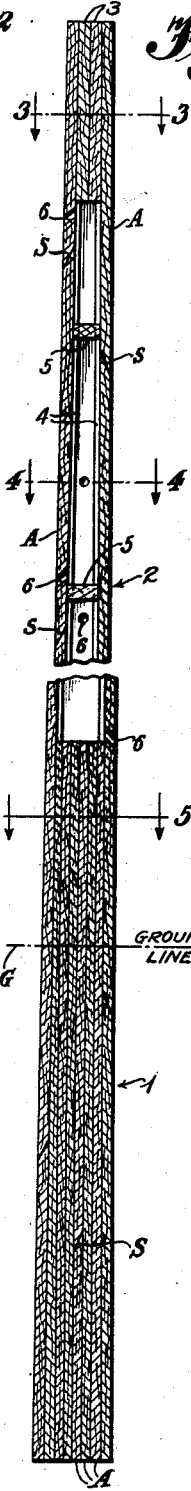
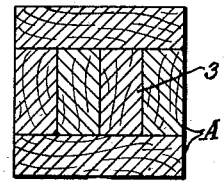
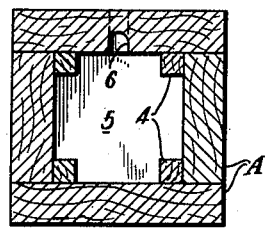
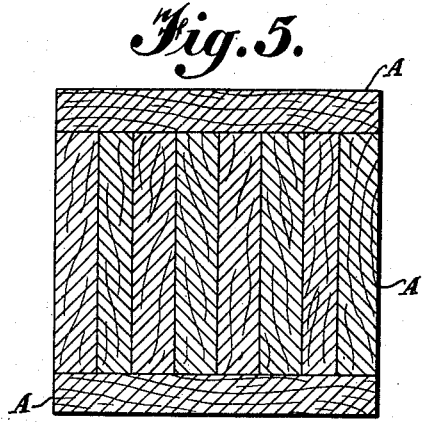
INVENTOR.
Robert J. Hoyle, Jr.
BY
ATTORNEYS Feb. 25, 1958 R. J. HOYLE, JR 2,824,342
FABRICATED POLE
Filed June 16, 1953 2 Sheets-Sheet 2
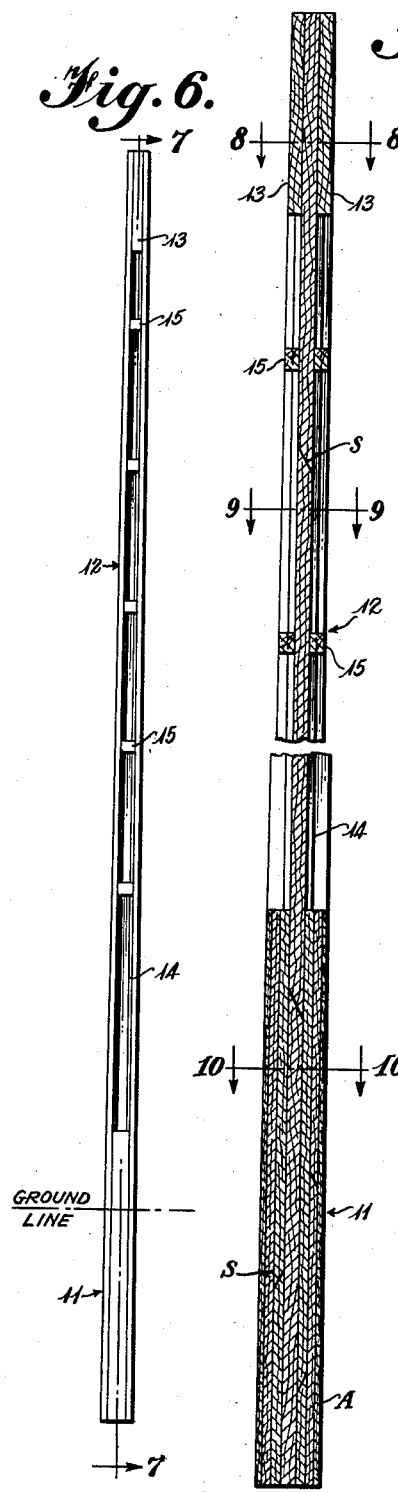
INVENTOR.
Robert J. Hoyle, Jr.
BY
Burns, Doane, Benedict
& Irons ATTORNEYS United States Patent Office 2,824,342
Patented Feb. 25, 1958

2,824,342

FABRICATED POLE

Robert J. Hoyle, Jr., Hyattsville, Md., assignor to Timber Engineering Company, Washington, D. C., a corporation of Delaware Application June 16, 1953, Serial No. 362,022

5 Claims. (Cl. 20—99)

This invention relates to a fabricated wood pole construction. More particularly, the invention relates to a fabricated wooden pole which is uniformly tapered throughout its length and has a built-up solid or thickened wall base portion to be suitable for use in supporting telegraph and electric service lines.

The dwindling supply of trees suitable for polestock as now extensively used for telephone and electric service lines, dictates the need for a pole substitute which can be produced at a reasonable cost and with a minimum weight. Thus it becomes extremely important to provide a suitable substitute for the conventional solid wood pole which will possess the strength and durability necessary for telephone and utility pole service. Such a pole must be characterized by simplicity of construction to keep production costs down, and lightness in weight for ease of handling.

It is a principal object of this invention to provide a fabricated wooden pole which may be used instead of, or as a replacement for the conventional solid wood poles now used for telephone and electric service lines.

It is a further object of this invention to provide a fabricated pole which is lighter in weight than conventional solid poles, while still possessing the required strength characteristics. Such a reduction in weight not only reduces the transportation costs for such poles, but also makes installation of such poles a simpler procedure.

Another object of this invention is to provide a fabricated wood pole which may utilize small dimensioned cuts of lumber glued into a laminated structure to reduce production costs and secure a strong pole substitute for conventional solid poles.

It is another object of this invention to provide a fabricated pole equivalent in strength to conventional wood poles by the provision of adequate wood material in the base portion to compensate for the weakening effect of moisture in the wood at the ground level. Further, the fabricated wood pole of this invention, being uniformly tapered throughout its length, contains the necessary amount of wood material at every point along its length to provide adequate strength for the particular length of pole with the minimum of weight.

An additional object of this invention is to provide a fabricated wood pole which may be effectively preservative-treated to resist rotting and insect attack.

These and other objects will become more apparent from the description of the specific embodiments illustrated on the drawings and specifically described hereinafter.

In the drawings:

Figure 1 is a side elevational view of one form of fabricated wood pole of this invention.

Figure 2 is a sectional view taken on lines 2—2 of Figure 1, with a portion of the pole being cut away.

Figure 3 is a cross-sectional view taken on line 3—3 of Figure 2.

Figure 4 is a cross-sectional view taken on line 4—4 of Figure 2.

Figure 5 is a cross-sectional view taken on line 5—5 of Figure 2.

Figure 6 is a side elevational view of a modified form of fabricated wood pole.

Figure 7 is a sectional view taken on line 7—7 of Figure 6, with a portion of the pole being broken away.

Figure 8 is a sectional view taken on line 8—8 of Figure 7.

Figure 9 is a sectional view taken on line 9—9 of Figure 7.

Figure 10 is a sectional view taken on line 10—10 of Figure 7.

The fabricated wood pole illustrated in Figures 1 through 5 is constructed of a plurality of strip laminations A. Each of these laminations A is made up of a number of random length boards joined in end to end relation by scarf joints S. The outermost laminations A are made of a length equal to the desired length of pole to be constructed and therefore extend from the bottom of the pole to the top thereof. The pole is constructed with a square cross section uniformly tapered throughout its length from the bottom of the base portion 1 to the top of the main portion 2 of the pole.

The base portion 1 is constructed to be of such a length that in use a portion thereof will be exposed above the ground line G. The base portion is assembled from a plurality of laminations A to give, as shown in Figure 5, a square or rectangular wood cross section. Although the four sides of the square pole consisting of the outermost laminations A extend throughout the length of the pole, the inner laminations in the base portion extend only from the bottom of the pole to a short distance above the intended ground line G. These laminations are all glued in the assembled relation shown to present a solid base portion 1. In gluing these laminations together it is desirable that a suitable waterproof glue be used to create a completely waterproof joint between the laminations since service conditions would generally cause delamination of joints made with non-waterproof glues.

The specific embodiment shown on the drawings illustrates the base portion 1 as being solid by assembling the plurality of laminations A and gluing same to a solid square or rectangular form. Such a construction is used in the smaller sizes of poles, since, as pointed out hereinafter, the solid wood material is important to provide adequate strength in the base portion where the wood is moist and therefore possesses lower strength properties.

However, in the larger pole sizes it is not necessary to make the base solid to obtain sufficient wood to support the main portion 2 of the pole. Accordingly in such larger poles the base may be constructed with thick walls with a hollow interior core. Such walls are made thicker than the walls of the main portion so as to offset the weakening of the wood caused by ground moisture surrounding the base portion surface. This thickening of the walls may be accomplished by assembling laminations A in concentric squares in the base portion or other suitable arrangements to produce thickened walls for this portion of the pole.

It is obvious that the portion of the pole embedded in the ground will be continuously subjected to the moisture existing within the ground. Further, the strength properties of wood vary with respect to the moisture content, with the greatest strength being obtained at very low moisture content and the lowest strength occurring at fiber saturation moisture content. At a moisture content exceeding fiber saturation, the strength of wood remains reasonably constant for any given species. Although the fiber saturation varies with the species of wood, it generally lies in the range of between 20% and 30% of the weight of completely dry wood.

Conventional solid round poles are classified on the basis of strength properties of green wood because (1) their moisture content is frequently above fiber saturation at the ground line, and (2) defects in the upper part of the pole prevent realization of the higher strength properties of the dry wood even though it may be well below the fiber saturation moisture content. Even if these defects did not exist, nature provides a pole of more or less uniformly tapered shape, and there is no practical reason to reduce the cross sectional area of the upper part of the pole to the size actually needed, since the material so removed cannot be utilized and the process of removal would be costly.

The fabricated pole of this invention is constructed to take advantage of the superior strength properties of dry wood in the above-ground portion of the pole, i. e. main portion 2, while the portion at and below the ground is constructed on the basis of the strength properties of green wood. Aside from the problem of overcoming moisture weakening in this fabricated wood pole construction, defects normally found in the upper parts of conventional poles which reduce the strength of such poles can be limited in the manufacture of fabricated wood poles by proper selection of the wood used in the laminations A. Thus it is possible to construct the fabricated pole with the use of less wood than contained in solid round poles of equal strength.

Since the strength of wood diminishes as the moisture content rises, the base portion 1 is made solid or thick-walled and hollow by the gluing of the several laminations A to supply the necessary strength requirements for the fabricated wood pole. Actual tests have proved that the high moisture content of the wood embedded in the ground does not end abruptly at the ground line. Instead the wood in the pole for a distance of two or three feet above the ground line is found to have a rather high moisture content such as exists in the part of the pole below the ground. In view of this fact, the base portion 1 is constructed of such a length that in its intended position of use only a part of the base portion is embedded in the ground and the remainder extends above the ground line. Thus the solid or thick-walled base portion provides adequate strength in this part of the pole to offset the weakening caused by moisture in the pole up to a point two or three feet above the ground line.

The main portion 2 is made up of a continuation of the outermost laminations A in the base portion 1. These laminations extend upwardly from the four sides of the square base portion 1 to form a hollow box cross section in the main portion 2 of the pole. The walls of this main portion are constructed to be of the minimum thickness required in the pole to reduce the weight and quantity of wood but still of sufficient thickness to provide the necessary strength for telephone and electric service line use. Such a strength must be sufficient to support the static loads to which the pole may be subjected and also any bending or buckling loads which may occur while in service.

The upper end of the main portion 2 is closed by the insertion of stiffening members 3 which are glued in position between the four side walls made up of the outermost laminations A. The provision of such stiffening members 3 creates a closed interior cavity within the pole construction illustrated in Figures 1 through 5 which cavity extends between the top of the solid base portion 1 and the bottom of the stiffening members 3. The wall cross section throughout the length of this cavity is illustrated by the sectional view of Figure 4. Thus the outermost laminations A extending upwardly from the base portion 1 are glued at their abutting edges to form a boxlike cross section.

To reinforce the corners of the boxlike cross section corner blocks 4 are glued on the interior of the cavity extending throughout the length of the cavity. These corner blocks 4 serve to provide additional bracing for the glued corner joint between the abutting edges of the side laminations A.

To additionally reinforce the box cross section present in the main portion of the pole, a plurality of load blocks 5 are suitably secured as by gluing at a plurality of spaced positions throughout the length of the main portion 2. These load blocks 5 bridge the space between the sides of the box section and thereby divide the interior cavity of the pole into a plurality of sections. The provision of such load blocks provides additional strength for the pole structure to withstand local loads imposed by attachment of cross-arms and other pole line equipment.

As noted hereinbefore, the wooden pole construction of this invention is uniformly tapered from the bottom to the top thereof. The taper in the pole structure shown in Figures 1 through 5 is created by gradually reducing the width of the outermost laminations A throughout their length and in the case of the solid base portion 1, reducing the width and thickness of the laminations which fill the space between the outermost laminations. Thus in the assembled pole, the two dimensions of the box cross section will be gradually reduced toward the uppermost end of the pole. The existence of this tapered construction insures that the pole will have sufficient supporting strength at the lower end thereof to take care of the greater bending moments in this point in the pole, whereas the upper end of the pole will contain only the required wood material to withstand shear and compressive forces asserted by the wires and cross bars being supported without containing unnecessary excess wood material which would merely add to the weight of the pole.

In producing conventional solid round poles, there exists the problem of seasoning and preserving so that such poles may be satisfactory for telephone and electric service line use. Thus with solid poles as with any heavy structural timber, the possibility of raising the strength properties of the wood therein by adequate drying is offset by the fact that such drying produces objectionable seasoning defects which cause a weakening of the solid wood pole. In the fabricated pole of this invention, adequately kiln dried lumber may be utilized, since the lumber used for fabricating is of relatively small dimensions and therefore not subject to seasoning defects as is true of heavy structural timbers.

In addition to the seasoning problem, solid wood poles generally contain knots of various sizes which, of course, serve to weaken the pole. Under the standards set up by the industry, the largest size knots permitted in solid round poles effect a 25% reduction in pole strength. In selecting lumber for fabricating the pole of this invention, material containing large knots and other defects which would materially reduce the strength of the material may be eliminated. Accordingly, the fabricated wood pole may contain a substantially smaller quantity of wood and still possess the load-carrying capacity of conventional solid round poles.

In preserving solid round poles by the use of creosote or other suitable preservative, it is impractical and all but impossible to obtain adequate preservative penetration throughout the entire volume of the solid wood pole. Surface penetration of preservative may be effective to a certain extent. However, any hole extending through the preservative treated outer surface wood to an unpreserved portion of a pole provides an avenue of access for insects and wood-destroying fungi, thus destroying the effectiveness of the preservative treatment. Therefore, in solid wood poles, seasoning checks, holes drilled for attaching the cross arms, climbing spikes or the lineman's shoes and nails driven into the surface of the pole may penetrate through the preserved volume of the pole and give rise to disintegration of the pole interior by providing access for insects and wood-destroying fungi.

The inherent preserving problem found in solid round wood poles is alleviated to a marked degree by the structural arrangement of the fabricated pole of this invention. Thus in the pole illustrated in Figures 1 through 5, the various sections of the interior cavity will be provided with suitable holes 6 for admission of preservative to the cavity and its subsequent drainage. Thus, after the entire pole has been fabricated, the entire interior and exterior of the pole may be treated by a suitable preservative fluid. The fact that the preservative may be introduced into the cavity of the pole enables the preservative to penetrate the walls of the pole both from the inside and outside thereof. Such preservative impregnation results in a finished pole product wherein substantially all of the wood utilized in the construction is impregnated with the preservative.

The holes 6 which are made at random along the pole, not only facilitate the introduction of preservative fluid into and out of the pole interior during treatment, but also function for drainage of any condensed water which might collect within the pole and permit air circulation through the pole interior to dry the pole wood and thus generally maintain the wood in its strongest dry state.

Since the base portion 1 is embedded in the ground for the most part, this part of the pole is subject to the greatest danger of insect attack and decay. Likewise, the solid portions at the end of the pole offer the greatest resistance to preservative penetration. Accordingly, it may be desirable in assembling the pole to initially subject the individual laminations used in the base portion to separate preservative treatment prior to the assembly of such laminations into the solid square base assembly. Such prior treatment of the laminations will insure the thorough impregnation with preservative of all of the wood material in the solid base portion of the pole. It is pointed out that recent research shows that it is entirely feasible to glue wood which has been previously treated with preservative. In view of this fact, it may prove more economical and/or desirable to preservative-treat all lumber for the pole prior to laminating the components together.

In Figures 6 through 10 of the drawings, a modified form of pole construction of this invention is illustrated. This modified form is basically similar to the construction shown in Figures 1 through 5 in that a plurality of random length strips are joined to make up the laminations used in assembling the pole construction. This form is also characterized by having a square or rectangular base portion 11 and uniformly tapered construction throughout the length of the pole.

The main portion 12 is made up of a continuation of two of the side laminations A from the base portion 11 and a continuation of the center lamination from the base portion, to produce an I-shaped cross section such as shown in Figure 9. The width of the side laminations is gradually reduced between the bottom and top of the pole to produce the uniform taper in one dimension while at the same time the width of the center lamination forming the web of the I-shaped cross section is reduced throughout its length to create the uniform taper in the other dimension of the pole cross section.

The top of the pole is provided with stiffening members 13 extending between the flanges of the I-shaped cross section to create a solid laminated wood assembly at this point in the pole, such as shown in Figure 8. These stiffening members are secured in their proper position by the use of a suitable water-proof glue.

To reinforce the I-shaped cross section present in the major part of main portion 12, corner blocks 14 are glued in the corners between the web and flanges of the I-shaped cross section. These corner blocks extend from the top of the base portion 11 to the bottom of the stiffening members 13. The provision of corner blocks 14 at the junction of the web and flanges of the pole cross section strengthens the cross section to assist in resisting bending and twisting forces which may be applied by the load which the pole is to support.

To additionally reinforce the I-shaped cross section, a series of load blocks 15 are secured as by gluing at spaced locations along the main portion 12 of the pole structure. These load blocks 15 are secured between the flanges and to the web of the I-shaped cross section with two such load blocks located in the same horizontal plane on opposite sides of the web. Such a construction further reinforces the main portion of the pole to resist bending and twisting moments applied by the load carried by the pole and provides anchorage for crossarms and pole line equipment.

In the modified pole construction of Figures 6 through 10, the relatively thin web and flanges of the I-shaped cross section can be impregnated with a suitable preservative compound after complete assembly of the pole. Due to the relatively thin cross sections to be impregnated, the entire volume of treatable wood in the pole can be preserved by the presently well-known methods of treating with a preservative fluid. Since there is no interior cavity in this pole structure embodiment, the preservative has direct access to all surfaces of the flanges and web of the I-shaped cross section for preserving this wood material. Accordingly the entire quantity of treatable wood making up the pole may be impregnated by usual conventional methods.

It will, of course, be recognized that as in the pole structure of Figures 1 through 5, the modified pole may have the base portion 11 thereof made up of laminations which have been subjected to preservative treatment prior to their assembly into the solid base construction. Such a prior impregnation will insure the thorough preserving of the wood volume in the base of the pole. Likewise, if desired, all of the material used in the pole may be previously preservative treated before assembly into the pole structure.

Having thus described my invention, what I claim is:

1. A fabricated pole comprising a plurality of laminations secured together to provide a laminated base portion having a substantially rectangular cross section, said base portion comprising several parallel laminations making up one dimension of said rectangular cross section and side laminations secured across the edges of said parallel laminations making up together with the width of said several parallel laminations the other dimension of said rectangular cross section, said side laminations and at least one of said several parallel laminations extending upwardly from said base portion, each of the laminations extending upwardly from said base portion being continuous along the length of said pole to provide load carrying members coextensive with the pole length and such upwardly extending laminations tapering throughout their length to form a uniformly tapered main portion above said base portion, a plurality of members secured intermediate the upper ends of the upwardly extending laminations to provide a laminated solid substantially rectangular cross section at the top of said main portion, corner blocks secured throughout a major portion of the length of said main portion in the corners at the junction of said upwardly extending laminations, and load blocks secured between said side laminations at spaced positions along the length of said main portion to brace the main portion of said pole and provide anchorage for pole line equipment and crossarms.

2. A fabricated pole having a laminated base portion and hollow main portion, said base portion being constructed of several parallel laminations secured together to make up one dimension of a substantially rectangular cross section and side laminations secured across the edges of said several laminations making up together with the width of said several parallel laminations the other dimension of said rectangular cross section, said side laminations and the outermost laminations of said several parallel laminations extending upwardly from said base portion and joined at their abutting longitudinal edges to form said hollow main portion of said pole, each of the laminations extending upwardly from said base portion being continuous along the length of said pole to provide load carrying members coextensive with the pole length and such upwardly extending laminations tapering throughout their length, and members secured within the upper end of said hollow main portion remote from said base portion to close such open end.

3. A fabricated pole as recited in claim 2 wherein the laminations making up the pole are constructed from a plurality of random length pieces joined in end to end relationship and the material in said pole is impregnated with a preservative compound throughout substantially its entire volume to reduce decay and insect attack.

4. A fabricated pole having a solid base portion and a main portion, said base portion being constructed of a plurality of laminations secured together to form a substantially rectangular cross section comprised of several parallel laminations making up one dimension of said rectangular cross section and side laminations secured across the edges of said parallel laminations making up together with the width of said several parallel laminations the other dimension of said rectangular cross section, said side laminations and the center lamination of said several parallel laminations extending upwardly from said base portion and joined at their abutting surfaces to form said main portion of a substantially I-shaped cross section, each of the laminations extending upwardly from said base portion being continuous along the length of said pole to provide load carrying members coextensive with the pole length and such upwardly extending laminations tapering throughout their length, and members secured between said side laminations and parallel to said center lamination at the end of said main portion remote from said base portion to form a solid reinforced top end for said pole.

5. A fabricated pole as recited in claim 4 wherein the laminations making up the pole are constructed from a plurality of random length pieces joined in end to end relationship and the material in said pole is impregnated with a preservative compound throughout substantially its entire volume to reduce decay and insect attack.

References Cited in the file of this patent

UNITED STATES PATENTS

| | | |
|---|---|---|
| 300,343 | Camp | June 17, 1884 |
| 719,841 | McCarthy | Feb. 3, 1903 |
| 765,053 | Tafel | July 12, 1904 |
| 1,377,891 | Knight | May 10, 1921 |
| 1,720,859 | Scott | July 16, 1929 |
| 2,091,861 | Junge | Aug. 31, 1937 |
| 2,362,269 | Hall | Nov. 7, 1944 |

FOREIGN PATENTS

| | | |
|---|---|---|
| 132,079 | France | July 29, 1879 |